(12) United States Patent
Arismendi-Macuer et al.

(10) Patent No.: US 11,957,133 B2
(45) Date of Patent: Apr. 16, 2024

(54) MODIFIED 1-METHYLCYCLOPROPENE (1-MCP) NANOBUBBLES

(71) Applicants: NANOTEC S.A., Santiago de Chile (CL); Universidad Andrés Bello, Santiago (CL)

(72) Inventors: Marlene Arismendi-Macuer, Santiago de Chile (CL); Patricio Jarpa, Santiago de Chile (CL); Danilo González, Santiago de Chile (CL); Reinaldo Campos Vargas, Santiago de Chile (CL)

(73) Assignees: Nanotec S. A., Santiago de Chile (CL); Universidad Andrés Bello, Santiago (CL)

( * ) Notice: Subject to any disclaimer, the term of this patent is extended or adjusted under 35 U.S.C. 154(b) by 584 days.

(21) Appl. No.: 16/818,253

(22) Filed: Mar. 13, 2020

(65) Prior Publication Data
US 2020/0296978 A1    Sep. 24, 2020

Related U.S. Application Data

(60) Provisional application No. 62/818,910, filed on Mar. 15, 2019.

(51) Int. Cl.
    *A23B 7/154*      (2006.01)
    *A23B 7/16*      (2006.01)
    (Continued)

(52) U.S. Cl.
    CPC ............... *A23B 7/154* (2013.01); *A23B 7/16* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 2013/0216657 A1* | 8/2013 | Kusuura | ................ B65B 55/00 426/310 |
| 2016/0166716 A1 | 6/2016 | Irudayaraj et al. | |
| | (Continued) | | |

FOREIGN PATENT DOCUMENTS

IN      2919MU2013 A      7/2015

OTHER PUBLICATIONS

Yasui et al. "Dynamic Equilibrium Model for a Bulk Nanobubble and a Microbubble Partly Covered with Hydrophobic Material" Langmuir 2016, 32, 11101-11110; Mar. 2016 (Year: 2016).*

(Continued)

*Primary Examiner* — Charles R Nold
(74) *Attorney, Agent, or Firm* — Buchanan, Ingersoll & Rooney PC

(57) ABSTRACT

The present disclosure relates to the generation of food grade sugar modified 1-MCP nanobubbles ranging in size from 50 to 600 nm. These nanobubbles have a high degree of stability while in aqueous solution and can inhibit the action of ethylene in different biological processes. In addition, they can reduce the action of ethylene in plant metabolism, making the plant less susceptible to water stress, low temperature stress, and stress from soil conditions, among others. This disclosure also relates to the method of preparing sugar modified 1-MCP nanobubbles, their different uses and applications.

1 Claim, 16 Drawing Sheets
(2 of 16 Drawing Sheet(s) Filed in Color)

(51) Int. Cl.
B82Y 30/00 (2011.01)
B82Y 40/00 (2011.01)

(56) References Cited

U.S. PATENT DOCUMENTS

2017/0202775 A1 7/2017 Gu et al.
2022/0279821 A1* 9/2022 Bowden .................. A23B 4/18

OTHER PUBLICATIONS

CN 1137748 Feb. 1997 (Year: 1996).*
Arora, A., "Biochemistry of Flower Senescence", Postharvest Biology and Technology of Fruits, Vegetables, & Flowers, 2008, Chapter 4, pp. 51-85.
Arora, A., "Programmed Cell Death during Plant Senescence", Postharvest Biology and Technology of Fruits, Vegetables, & Flowers, 2008, Chapter 5, pp. 86-124.
Bapat et al., "Ripening of fleshy fruit: Molecular insight and the role of ethylene", Biotechnology Advances 28 (2010), pp. 94-107.
Blackenship et al., "1-Methylcyclopropene: a review", Postharvest Biology and Technology 28 (2003), pp. 1-25.
Cameron et al., "1-MCP blocks ethylene-induced petal abscission of Pelargonium peltatum but the effect is transient", Postharvest Biology and Technology 22 (2001), pp. 169-177.
Fisher et al., "Synthesis of 1-Methylcyclopropene", Notes, vol. 30, Jun. 1965, pp. 2089-2090.
Huber, D., "Suppression of Ethylene Responses Through Application of 1-Methylcyclopropene: A Powerful Tool for Elucidating Ripening and Senescence Mechanisms in Climacteric and Nonclimacteric Fruits and Vegetables", HortScience, vol. 43(1), Feb. 2008, pp. 106-111.
Jiang et al., "Ethylene regulation of fruit ripening: Molecular aspects", Plant Growth Regulation 30: 2000, pp. 193-200.
Kesari et al., "Ethylene-induced ripening in banana evokes expression of defense and stress related genes in fruit tissue", Postharvest Biology and Technology 46 (2007), pp. 136-143.
Magid et al., "An Efficient and Convenient Synthesis of I-Methylcyclopropene1", J. Org. Chem., Notes, vol. 36, No. 9, 1971, pp. 1320-1321.
"Nanobubbles (Ultrafine bubbles)", Water Structure and Science, Isbu.ac.uk/water/nanobubble.html, downloaded from the internet Apr. 14, 2022, 16 pages.
Pongprasert et al., "Using of 1-MCP Micro- and Nano-Bubbles as a Novel Postharvest Technique for Delaying Postharvest Ripening of Banana Fruit", Agricultural Sci. J., 43: 3 (Suppl.): (2012) pp. 284-287. (Abstract).
Serek et al., "Controlling ethylene responses in flowers at the receptor level", Biotechnology Advances 24 (2006), pp. 368-381.
Varanasi et al., "Differential Suppression of Ethylene Biosynthesis and Receptor Genes in 'Golden Delicious' Apple by Preharvest and Postharvest 1-MCP Treatments", J. Plant Growth Regulation (2013) 32, pp. 585-595.
Watkins et al., "The use of 1-methylcyclopropene (1-MCP) on fruits and vegetables", Biotechnology Advances 24 (2006), pp. 389-409.
Wills et al., "Efficacy of Potassium Permanganate Impregnated into Alumina Beads to Reduce Atmospheric Ethylene", J. Amer. Soc. Hort. Sci. 2004, 129(3), p. 433-438.

* cited by examiner

Size Statistics Report by Number
v2.0

Malvern Instruments Ltd - © Copyright 2008

Sample Details

| | |
|---|---|
| Sample Name: | NBS MCP 1 |
| File Name: | Marlene.dts |
| SOP Name: | mansettings.nano |
| Measurement Date and Time: | martes, 04 de septiembre de 2018 15:27:03 |

| | | | | |
|---|---|---|---|---|
| Z-Average (nm): | 322,2168 | | Derived Count Rate (kcps): | 550,11852012903 |
| Standard Deviation: | 0 | | Standard Deviation: | 0 |
| %Std Deviation: | 0 | | %Std Deviation: | 0 |
| Variance: | 0 | | Variance: | 0 |

| Size d.nm | Mean Number Percent | Std Dev Number Percent | Size d.nm | Mean Number Percent | Std Dev Number Percent | Size d.nm | Mean Number Percent | Std Dev Number Percent | Size d.nm | Mean Number P |
|---|---|---|---|---|---|---|---|---|---|---|
| 0,4000 | 0,0 | | 5,615 | 0,0 | | 78,82 | 0,0 | | 1106 | |
| 0,4632 | 0,0 | | 6,503 | 0,0 | | 91,28 | 0,0 | | 1281 | |
| 0,5365 | 0,0 | | 7,531 | 0,0 | | 105,7 | 0,0 | | 1484 | |
| 0,6213 | 0,0 | | 8,721 | 0,0 | | 122,4 | 4,4 | | 1718 | |
| 0,7195 | 0,0 | | 10,10 | 0,0 | | 141,8 | 15,9 | | 1990 | |
| 0,8332 | 0,0 | | 11,70 | 0,0 | | 164,2 | 25,1 | | 2305 | |
| 0,9649 | 0,0 | | 13,54 | 0,0 | | 190,1 | 24,7 | | 2669 | |
| 1,117 | 0,0 | | 15,69 | 0,0 | | 220,2 | 17,6 | | 3091 | |
| 1,294 | 0,0 | | 18,17 | 0,0 | | 255,0 | 9,1 | | 3580 | |
| 1,499 | 0,0 | | 21,04 | 0,0 | | 295,3 | 2,8 | | 4145 | |
| 1,736 | 0,0 | | 24,36 | 0,0 | | 342,0 | 0,4 | | 4801 | |
| 2,010 | 0,0 | | 28,21 | 0,0 | | 396,1 | 0,0 | | 5560 | |
| 2,328 | 0,0 | | 32,67 | 0,0 | | 458,7 | 0,0 | | 6439 | |
| 2,696 | 0,0 | | 37,84 | 0,0 | | 531,2 | 0,0 | | 7456 | |
| 3,122 | 0,0 | | 43,82 | 0,0 | | 615,1 | 0,0 | | 8635 | |
| 3,615 | 0,0 | | 50,75 | 0,0 | | 712,4 | 0,0 | | 1,000e4 | |
| 4,187 | 0,0 | | 58,77 | 0,0 | | 825,0 | 0,0 | | | |
| 4,849 | 0,0 | | 68,06 | 0,0 | | 955,4 | 0,0 | | | |

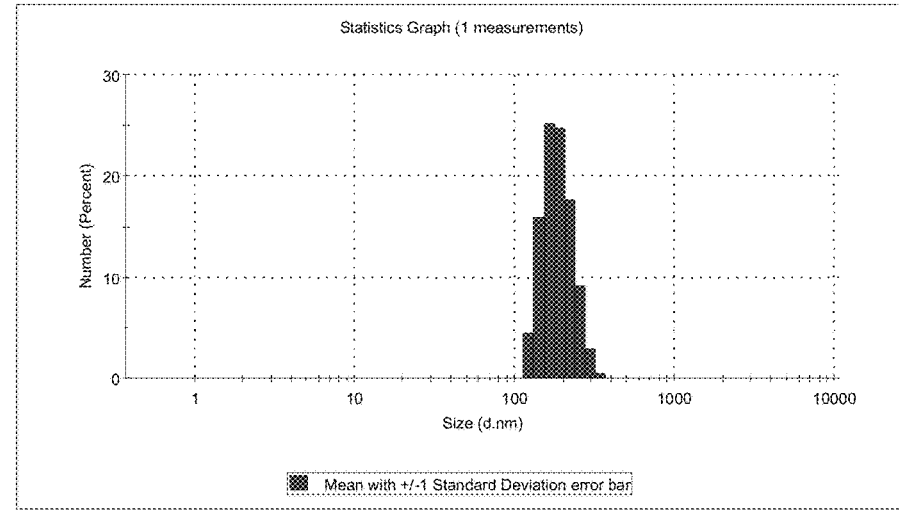

Malvern Instruments Ltd
www.malvern.com

Zetasizer Ver. 7.12
Serial Number : MAL1075099

File name: Marlene.dts
Record Number: 1
04 sep 2018 15:50:24

FIG. 5

(Vertical Legend: Horas = Hours)

(Vertical Legend: Horas = Hours)

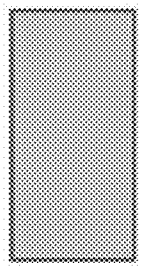 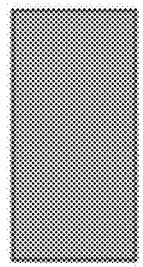 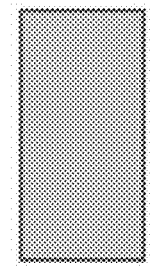
Red: 209  Red: 188  Red: 219
Green: 201  Green: 156  Green: 197
Blue: 120  Blue: 78  Blue: 114
FIG. 21A   FIG. 21B   FIG. 21C
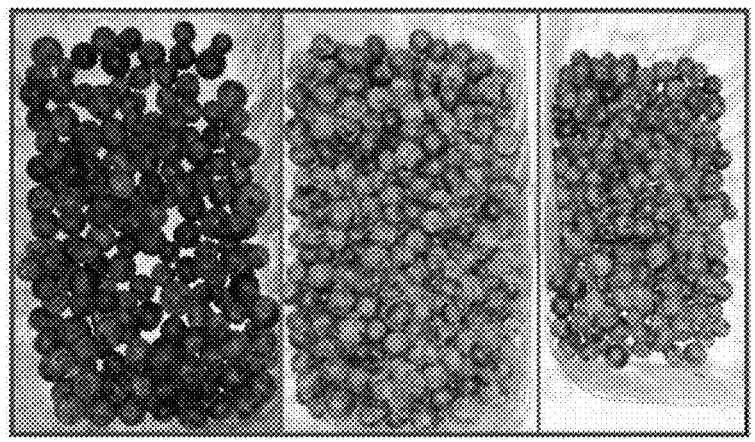
FIG. 22A   FIG. 22B   FIG. 22C

MODIFIED 1-METHYLCYCLOPROPENE (1-MCP) NANOBUBBLES

CROSS REFERENCE TO RELATED APPLICATION

This application claims priority to U.S. Provisional Application No. 62/818,910, filed Mar. 15, 2019, the contents of such application being incorporated herein by reference.

FIELD OF THE INVENTION

The invention relates to the generation of modified 1-methylcyclopropene (1-MCP) nanobubbles that have a high degree of stability in aqueous solution and which make it possible to inhibit the action of ethylene in different biological processes, such as fruit ripening, inhibition of senescence associated processes, and loss of chlorophyll in plant organs under stress. In addition, they can reduce the action of ethylene in plant metabolism, making them less susceptible to water stress, low temperature stress, and stress from soil conditions, among others.

BACKGROUND ART

Ethylene is a compound with a simple chemical structure, an unsaturated hydrocarbon containing only 2 carbons and a double bond that binds them. It is present in plants where it influences the ripening and fall of fruit by regulating a number of bio-processes and senescence ((Zacarias, 1993. Ethylene; Faust, 1989. Physiology of temperate zones trees), each incorporated by reference herein. Its gaseous nature provides it with special features that are unique among the various phyto-regulators (Becerra, 2005. Evaluation of 1-mcp (1-methyclicopropen), as an ethylene inhibitor in the ripening of kiwi fruits).

Ethylene regulates the ripening and senescence of agricultural products at the molecular, biochemical and physiological level (Kesari et al., 2007), incorporated by reference herein. Ethylene-induced ripening in banana evokes expression of defense and stress related genes in fruit tissue), by stimulating the expression of genes that code for change regulating enzymes during maturation and/or senescence (Jiang y Fu, 2000. Ethylene regulation of fruit ripening: Molecular aspects), incorporated by reference herein. Ethylene plays two roles in the post-harvest phase: on the one hand, it causes the fruits to acquire optimal organoleptic characteristics for consumption, while it is also responsible for the tissues senescence which generates adverse effects on the fruits' quality (Bapat et al., 2010. Ripening of fleshy fruit: Molecular insight and the role of ethylene). Ethylene is also involved in the fall of flowers which is directly related to the fruit set. Ethylene is also a plant hormone that is involved in multiple processes in response to various types of stresses (mechanical damage, drought, flooding, diseases, and pests), senescence, flowering in some plants, and induction of root hairs, root elongation, synthesis of pigments and aromas, and degradation of chlorophyll.

Inhibition of ethylene's action can produce beneficial effects, for example in the transportation and storage of fruits. The beneficial effects of inhibiting the action of ethylene include, among others: delay in the fruit ripening process, inhibition of processes associated with senescence and loss of chlorophyll in plant organs, and under conditions of stress the reduction of ethylene's action on the plant's metabolism makes it less susceptible to water stress, low temperature stress, soil condition stress.

Ethylene is also directly associated with any type of stress the plants may encounter, therefore those tools that inhibit hormones or ethylene in the different stress processes mentioned above will generate considerable changes in pre and post-harvest result of fruits, for example.

Knowledge regarding ethylene's action mechanisms has led to different technologies and methods for reducing its negative effects. These include refrigeration and the use of modified and controlled atmospheres among others. Nonetheless, chemicals used to delay ripening have shown the greatest efficiency in controlling the maturity and senescence of fruits, vegetables and flowers (Arora et al., 2008 Postharvest biology and technology of fruits, vegetables, and flowers), incorporated by reference herein (Table 1).

TABLE 1

Ethylene inhibition process with the use of chemical agents (Sereck et al, 2006. Controlling ethylene responses in flowers at the receptor level), incorporated by reference herein.
Chemical strategies to inhibit the effects of ethylene

| Processes | Chemicals/environmental inhibition | Molecular genetic inhibition |
|---|---|---|
| ACC Synthase (ACS) ↓ | AV/AOA/high $CO_2$ | Anti-ACS/Co-suppression ACS |
| ACC ↓ | | Heterologous bacterial expression/ACC deaminase |
| ACC oxidase (ACO) ↓ | $CoCl_2$/alpha-amino isobutyric acids/low $O_2$ concentration/high temperature | Anti ACO/Co-suppression/ACO |
| Ethylene gas ↓ | Ventilation removal/ chemical removal with $KMnO_4$/zeolite absorption | |
| Receptor | STS/2,5-NBD/DACP/1-MCP/CP/3,3-DMCP/1-DCP/1-HCP | Expression of mutated ethylene receptor (etrl-1) |
| Responses | Low temperature/cytokine | Expression of the IPT gene from *Agrobacterium tumefaciens* |

Current Solution

Ripening retardant chemicals can be classified into ethylene synthesis inhibitors, which include products such as aminoethoxyvinylglycine (AVG) and aminooxyacetic acid (AOA); ethylene signaling inhibitors (action), such as 1-methylcyclopropene (1-MCP) and silver salts (silver nitrate and thiosulfate) (Serek et al., 2006. *Controlling ethylene responses in flowers at the receptor level*), incorporated by reference herein, among others. Another group of retardants are ethylene oxidants, with potassium permanganate $KMnO_4$ being the most important product (Wills and Warton, 2004. Efficacy of potassium permanganate impregnated into alumina beads to reduce atmospheric ethylene), incorporated by reference herein. However, the use of $KMnO_4$ creates risky situations as it is an irritant for its users, harmful if swallowed, and is a fire hazard when in contact with combustible materials, in addition to being considered an environmental pollutant. The stabilization of 1-MCP gas in water as an ethylene inhibitor molecule in plants, has also been considered. The disadvantage of this product, given that it is a gas contained in cyclodextrins, is that once it is in a liquid medium it is quickly released into the atmosphere, which means that the enclosure used must be highly airtight if it is to be effective on the actions of ethylene.

1-methylcyclopropene (1-MCP)

1-methylcyclopropene is a synthetic plant regulator that acts as an inhibitor to the action of ethylene.

At present it is one of the most promising compounds for regulating climacteric fruit ripening, inhibition of senescence of leafy vegetables, cut flowers and many species of ornamental plants. Exposure to 1-methylcyclopropene in varying concentrations for several hours, depending on the species, (but which can be as low as 0.2 µL-1, for example, in pears), renders certain fruits and vegetables insensitive to ethylene for considerable periods of time (days to weeks). 1-methylcyclopropene appears to act by blocking the access of ethylene to its place on the transmembrane receptor presumably located in the plasma membrane, whereby the tissues become unable to perceive the presence of ethylene. Numerous successful trials have been carried out with apples, plums, kiwis, persimmons, avocados, pears, tomatoes and other climacteric fruits, and it is widely used commercially for apples.

From the different publications related to this compound that describe its features and uses, it is known that 1-MCP ($C_4H_6$) is a cyclic olefin at standard temperature, and at pressure it is a gas with a molecular weight of 54 g/mol (Blankenship and Dole, 2003. 1-Methylcyclopropene: A Review. Postharvest Biology and Technology), incorporated by reference herein. (In et al., 2013. 1-MCP occupies ethylene receptors irreversibly, blocking the signal transduction cascade that leads to the expression of genes related to the response to ethylene), incorporated by reference herein. 1-MCP's affinity for the receptors is ten times greater than that of ethylene and acts at lower concentrations, it also regulates ethylene biosynthesis through the inhibition of an autocatalytic process (Blankenship and Dole, 2003. 1-Methylcyclopropene: A Review. Postharvest Biology and Technology), incorporated by reference herein. The compound is non-toxic, odorless, stable at room temperature, easy to apply, and highly effective in protecting many agricultural species, including fruits, vegetables, cut flowers, and potted plants from the action of ethylene (Serek et al., 2006. Controlling ethylene responses in flowers at the receptor level; Watkings, 2006; Huber, 2008, each incorporated by reference herein. The use of 1-methylcyclopropene (1-MCP) on fruits and vegetables). Although the 1-MCP bond is irreversible, it has been reported that tissues can recover sensitivity to ethylene, along with their ability to synthesize new receptors (Cameron and Reid, 2001. 1-MCP blocks ethylene-induced petal abscission of *Pelargonium peltatum* but the effect is transient), incorporated by reference herein, depending on the species, tissue, developmental stage, and environment (Varanasi et al., 2013. Differential suppression of ethylene biosynthesis and receptor genes in 'Golden Delicious' apple by preharvest and postharvest 1-MCP treatments), incorporated by reference herein.

The concentration of 1-MCP necessary to block the action of ethylene varies by species, crop, state of ripeness, ability to generate new receptors, and time and temperature of exposure (Watkins, 2006. The use of 1-methylcyclopropene (1-MCP) on fruits and vegetables), incorporated by reference herein. Optimal doses vary among species, but different concentrations and temperatures have been reported (Blankenship y Dole 2003. 1-Methylcyclopropene: A Review. Postharvest Biology and Technology) for the application of 1-MCP ranging from 0.1 to 100 µL L−1 at 20-25° C. for 6 to 24 h. For example, the recommended concentration for commercially used products (EthylBloc® and SmartFresh™) is between 0.6 to 2.0 µL L−1 (according to product label).

Nanobubbles

The bubbles are cavities filled with air or gas within a liquid. In the liquid, the bubbles are at internal equilibrium pressures, at least those found in the environment. Each bubble is surrounded by an interface that has properties that are different from the global solution. For example, surfactants can stabilize bubbles of all sizes, but bubbles can also form without them. The large bubbles (>100 µm in diameter) rapidly increase in size (>6 mm s$^{-1}$) and rise directly to the surface where they collapse and disperse the air or gas contained within them. The microbubbles (1 µm-100 µm in diameter), provide a higher surface area per unit of volume, due to their smaller size, than the larger bubbles that are commonly seen. Microbubbles can be produced by numerous methods and have been used for solubilizing sludge, water purification, wastewater treatment, drug delivery, and as a contrast agent in conjunction with ultrasound. The microbubbles are not stable for long periods (~ minutes), they rise slowly ($10^{-3}$-10 mm×5$^{-1}$) and indirectly to the surface where they collapse, but the smaller ones (≈20 µm in diameter) contract to form more stable and effective nanobubbles.

Only these small bubbles (<1 µm in diameter) remain stable for significant periods in suspension (they increase to less than $10^{-2}$ µm×s$^{-1}$, but this is counteracted by a Brownian motion of more than 1 µm×s$^{-1}$) compared to larger or smaller bubbles that quickly disappear from aqueous suspensions, unless stabilized with surfactants. Normally, nanobubbles are present in lower quantities in aqueous solutions. The presence of cavitation nuclei in pure water is necessary, the formation of the nuclei allows for the presence of air nanobubbles in the water, particularly when this water does not contain foreign micro-particles and the vessel is free of wall defects (lsbu.ac.uk/water/nanobubble.html).

In the current scientific literature, nanobubbles are generally recognized as those gaseous cavities having diameters of less than one micron. Such cavities (bubbles) are often more than 100 nm in diameter, but the term "nano" is mainly applied to particles of smaller diameter (<100 nm, ISO/TS 27687: 2008).

The surface area of a bubble's volume is inversely proportional to the diameter of the bubble. Thus, for the same bubble volume, its surface area (A) increases proportionally to the reduction of the bubble's diameter (D; A=6/D); for example, 1 ml of bubbles with a radius of 100 nm (2×1,015 bubbles) has 1,000 times more surface area (60 m$^2$) than 1 ml of 0.1 mm bubbles (2×106 bubbles, 0.06 m$^2$).

The invention also proposes encapsulating the 1-MCP gas in water using nanotechnology, specifically by transforming the 1-MCP gas into nanobubbles sizes of between 70 nm and 300 nm. Nanobubbles are extremely small bubbles (10$^{-9}$ m nanometric) that are submerged and stabilized in water. It should be borne in mind that in recent years nanobubbles have been the focus of much attention in various fields of research due to their amazing effects, and also because the reason why they are so stable is still under discussion as they seem to challenge several basic principles of gas thermodynamics.

A general state of the art related to nanobubbles can be find in documents such as US 2017 202775, incorporated by reference herein, which discloses a solution of free gas nanobubbles mixed with a lipid material for use in contrast delivery systems and/or drug delivery by ultrasound, and that belongs to the technical field of medicine. Document US 2016 166716 refers to a nanobubble comprising a continuous outer shell, the outer shell comprising a crosslinked polymeric material, an inner wall of the continuous outer shell and a hollow core within the continuous outer shell. Finally, document IN 2919 MU2013, incorporated by reference herein, discloses nanobubble and nanoparticle complexes comprising (i) nanobubbles with a composition of a phospholipid; an amphiphilic derivative of vitamin E; a gas and (ii) nanoparticles with a fatty acid composition; a phospholipid; a drug; and a pro-apoptotic agent. The nanobubbles of nanobubble and nanoparticle complexes can be used as ultrasound contrast agents and also as carriers loaded with drug-loaded SLGs.

However, none of these documents disclose 1-MCP nanobubbles modified with a food-grade sugar that allow inhibiting the action of ethylene in different biological processes, or that allow reducing the action of ethylene in plant metabolism.

With regards to the present invention, an example of 1-MCP nanobubble application is mentioned in the publication of Pongprasert, N., P. et al. (2012) (Pongprasert, N., P. Boonyaritthongchai and V. Srilaong. (2012), each incorporated by reference herein. 1-*MCP Micro and nanobubbles using as a novel postharvest technique for delay postharvest ripening of banana fruits*. 10th National Postharvest Conference, Khon Khen, Thailand), incorporated by reference herein, where it is reported that spraying with 1-methylcyclopropane (1-MCP) is widely used, for example, to extend the post-harvest life and maintain the quality of green bananas, and that a longer application time, uneven ripening and green ripening are disadvantages associated with 1-MCP fumigation of bananas. The authors have researched the application of a micro and nano bubble technology for post-harvest handling by formulating 1-MCP preparations designed for use as aqueous micro and nano-bubble solutions (MNB). This research led to the conclusion that micro and nanobubbles (1-MCP-MNB) have the potential to be used and that they slow the ripening of banana fruit, as well as that of other species. However, the application of 1-MCP-MNB mentioned by the authors requires an air nanobubble generator. This air is injected into a pool with several liters of water and then the market product is dissolved. This product is a powder containing 1-MCP at 3% w/w encapsulated in cyclodextrin that when immersed in water in pools of approximately 25 liters, begins to quickly release the 1-MCP gas that is released into the atmosphere leaving large amounts of this gas unused. Then the bananas are submerged in the liquid for treatment. This system requires a very complex logistical process, namely transporting large quantities of water while also requiring the purchase of the 1-MCP encapsulation product currently on the market. It is imperative to mention that the process proposed by the researchers in this publication is not transportable, which is why direct applications cannot be carried out in the field. Furthermore, production of air nanobubbles and 1-MCP is required, which decreases the concentration of 1-MCP nanobubbles in the prepared solution. In addition, the process of immersing the fruits in these pools would favor the development, growth and accumulation of bacteria and fungi along with providing an optimal temperature for fruit rot, leading to numerous complications in terms of effectiveness and efficiency in the field, for example.

Sugar Modified 1-Mcp Nanobubbles

The stability of the 1-MCP nanobubbles is due to the fact that the 1-MCP molecule is hydrophobic and has low solubility in aqueous solution when compared to $CO_2$. However, the presence of double bonds in the propyl ring contributes to the efficient packaging of the 1-MCP molecules through pi-pi-type interactions, which are complemented by Van der Waals interactions. These two molecular interactions compensate for the volatility of the 1-MCP gas thereby allowing the stabilization of the nanobubble.

A cavitation generation process is a key element for producing and obtaining 1-MCP nanobubbles. The successful production of nano-bubbles requires the generation of cavitations at the nanoscale level, which rapidly collect the 1-MCP gas molecules that are weakly solubilized in water. Cavitation generates a water-free micro-environment that is much more stable than its interaction with water. Similarly, cavitation can accommodate a high number of gas molecules until the gas-gas repulsion exceeds the gas-water interaction. Nano-cavity generation has a very short half-life, close to 2 microseconds, however, it has been observed through molecular simulations that a 6 nm cavity is filled with gas molecules in less than 200 picoseconds due to the high diffusion that gas molecules normally have in an aqueous medium.

SUMMARY OF THE INVENTION

To overcome the disadvantages described in the state of the art and those related to 1-MCP application techniques, this application proposes the generation of modified 1-MCP nanobubbles as they have a high degree of stability while in aqueous solution and enable inhibition of ethylene's actions across different biological processes.

In view of the above, this application proposes 1-MCP nanobubbles modified with food grade sugars, which are presented in the form of additives containing high concentrations of nanobubbles, thereby allowing the 1-MCP gas to be more efficient in inhibiting the action of the ethylene. The sugar modified 1-MCP nanobubbles are very stable and versatile as they are obtained in high concentrations that are applied as an additive which is easy to transport and apply. These nanobubbles can be applied by spraying using conventional machinery, airplanes, drones, and irrigation systems both in closed spaces and over large areas of field, without 1-MCP gas diffusion into the atmosphere.

The sugar modified 1-MCP nanobubbles proposed in this application offer a series of applications and uses including spraying with conventional machinery in fruit packing facilities, and use in different sectors such as: drench (where the fruit is moistened with water), packing lines, pre-cooling, storage, refrigeration and transport. Field spraying can be carried out using conventional machinery, airplanes or drones.

In order to provide greater stability to the 1-MCP gas nanobubbles, this application proposes using small food grade sugars which interact with the surface of the nanobubble and also generate a network of hydrogen bridges between the sugars that form a type of "decoration" or coating surrounding the nanobubble. This will make it possible to obtain a solution of nano-bubbles with a longer half-life and less sensitivity to work and handling at the application site, for example on crops or in fields. The food grade sugar used to stabilize the 1-MCP nanobubbles can be selected from sucrose esters, maltodextrins, different types of starches, hydroxymethyl cellulose, disaccharides and monosaccharides in general.

An aspect of the present invention relates to the generation of food-grade-sugar-modified-1-MCP nanobubbles ranging in size from 50 to 600 nm. These nanobubbles have a high degree of stability in aqueous solution and can inhibit the action of ethylene in different biological processes. In addition, they can reduce the action of ethylene on plant metabolism, making the plants less susceptible to water stress, low temperature stress, and stress from soil conditions, among others.

An aspect of the invention also proposes encapsulating the 1-MCP gas in water using nanotechnology, specifically by transforming the 1-MCP gas into nanobubbles sizes of between 70 nm and 300 nm. Nanobubbles are extremely small bubbles ($10^{-9}$ m nanometric) that are submerged and stabilized in water. It should be borne in mind that in recent years nanobubbles have been the focus of much attention in various fields of research due to their amazing effects, and also because the reason why they are so stable is still under discussion as they seem to challenge several basic principles of gas thermodynamics.

An aspect of the present invention describes the generation of sugar modified 1-MCP nanobubbles which have a high degree of stability in aqueous solution and can be used to inhibit the action of ethylene in different biological processes.

An aspect of the invention also relates to the method of preparing sugar modified 1-MCP nanobubbles, their different uses and applications.

BRIEF DESCRIPTION OF THE DRAWINGS

The patent or patent application file contains drawings executed in color. Copies of this patent or patent application publication with color drawings will be provided by the Office upon request and payment of the necessary fee.

FIG. 5: Results of dynamic light scattering (DLS) analysis.

FIGS. 21A-21C: Coloring of 3 cherry's tails not treated by 30 days; stored at 0° C.

FIGS. 22A-22C: Photographic record of post-harvest blueberries stored 30 days without treatment (FIG. 21A) and treated with modified 1-MCP nanobubbles (FIGS. 21B and 21C).

DETAILED DESCRIPTION OF THE EMBODIMENT

This application aims to generate food grade sugar modified 1-MCP nanobubbles ranging in size from 50 to 600 nm. The food grade sugars used to stabilize the 1-MCP nanobubbles are selected from the group consisting of sucrose esters, maltodextrins, different types of starches, hydroxymethyl cellulose, disaccharides and monosaccharides in general. The concentration range of food grade sugars in the modified 1-MCP nanobubble ranges from 0.01 to 3 ppm, and the concentration of 1-MCP nanobubbles in aqueous solution can vary between 0.01 ug/L and 3.0 ug/L.

It has been determined that these modified 1-MCP nanobubbles demonstrate a high degree of stability in aqueous solution thereby enabling them to inhibit the action of ethylene across a variety of biological processes such as fruit ripening, inhibition of processes associated with senescence and loss of chlorophyll in plant organs under conditions of stress, with the reduction of ethylene's action on a plant's metabolism making it less susceptible to water stress, low temperature stress, and soil condition stress, among others.

These food grade sugars have been selected, using theoretical-experimental studies, because of their safety and use in the food industry, in addition to their ability to form hydrogen bridges between themselves over the inter-facial area of the 1-MCP nanobubbles which stabilizes them and increases their half-life to long periods of time (between 12 and 14 months). As mentioned above, the concentration of food grade sugars in the modified 1-MCP nanobubbles varies between 0.01 ppm and 3 ppm, with these concentrations being sufficient to stabilize the nanobubbles that vary in size from 50 to 600 nanometers, with sizes in the predominant population of between 100-200 nanometers.

Depending on the objective, the modified 1-MCP nanobubbles of this invention can be applied by spraying, with conventional machinery, on vegetable products to inhibit or delay the ethylene's action in different sectors of fruit packing facilities, including in drench applications, on the packing line, during pre-cooling, and refrigerated storage and transport. Field spraying can be carried out using conventional machinery, airplanes or drones.

Lastly, this invention relates to the method for preparing the modified 1-MCP nanobubbles which comprises the steps of in situ preparation of the 1-MCP nanobubbles and their stabilization with different food grade sugars.

Application Examples Synthesis of 1-methylcyclopropene

The synthesis of 1-Methylcyclopropene was carried out using two methods:
Method 1: Synthesis of 1-MCP in a Simple Distillation System.

Figure 1:
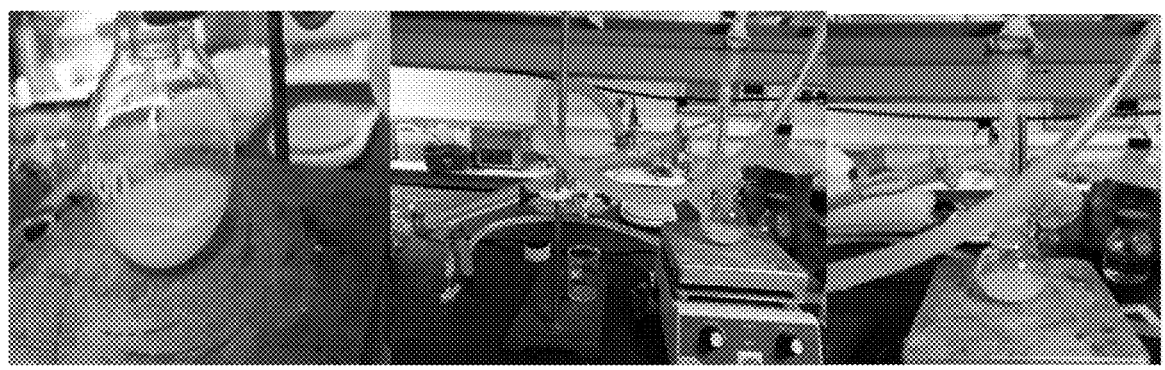
FIG. 1: Synthesis of 1-MCP in a simple distillation system.

In a 250 mL round-bottom double-necked flask, which is connected to a simple distillation system, 10 mL of dry tetrahydrofuran and 2 mL of 1-chloromethylpropene is added (FIG. 1), with both reagents being injected through a chemical septum. The closed system was kept in an inert argon atmosphere, and the reaction mixture was stirred for 30 minutes at a temperature of 30° C. After the homogenization time had elapsed, 22 mL of phenyllithium was added, the reaction was maintained for an additional 30 minutes, with constant stirring, and the reaction temperature spontaneously varied from 30° C. to 50° C. (Sample 1). The released gases were obtained by distillation.
Method 2: Synthesis of 1-MCP with Gas Collection.

Figure 2A:
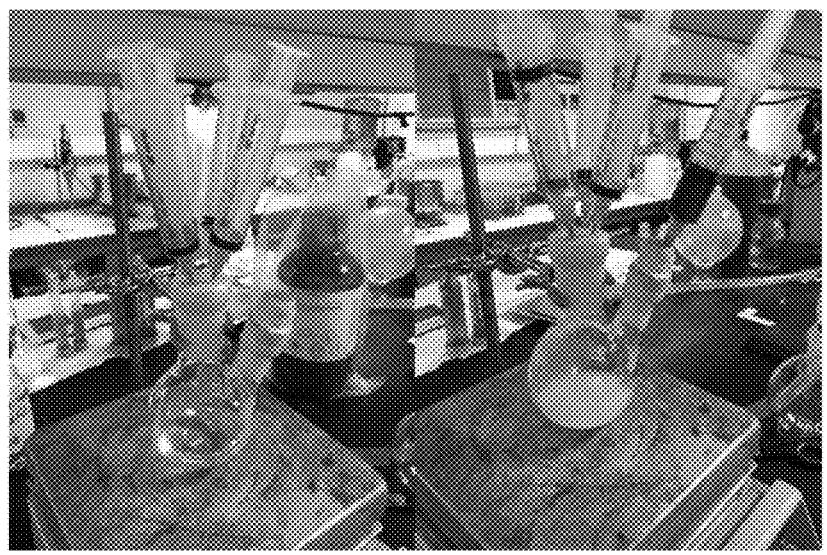
FIG. 2: Synthesis of 1-MCP with gas collection showing the reaction of the mixture of 1-methylcyclopropene with tetrahydrofuran (FIG. 2A) and obtaining the precipitate at the end of the reaction (FIG. 2B).
Figure 2B:

In a 250 mL round-bottom double-necked flask, (where both necks were sealed with chemical septa to which four 10 mL syringes were connected), 10 mL of dry tetrahydrofuran and 2 mL of 1-chloromethylpropene (FIG. 2A) were added, with both reagents being injected through a chemical septum. The closed system was maintained in an inert argon atmosphere, and the reaction mixture was stirred for 30 minutes at a temperature of 30° C. After the homogenization time had elapsed, 22 mL of phenyllithium was added, the reaction was maintained for an additional 30 minutes, with constant stirring, and the reaction temperature spontaneously varied from 30° C. to 50° C. (FIG. 2B). The removed gas was contained in the syringes in order to quantify the amount of gas released.

Figure 3:
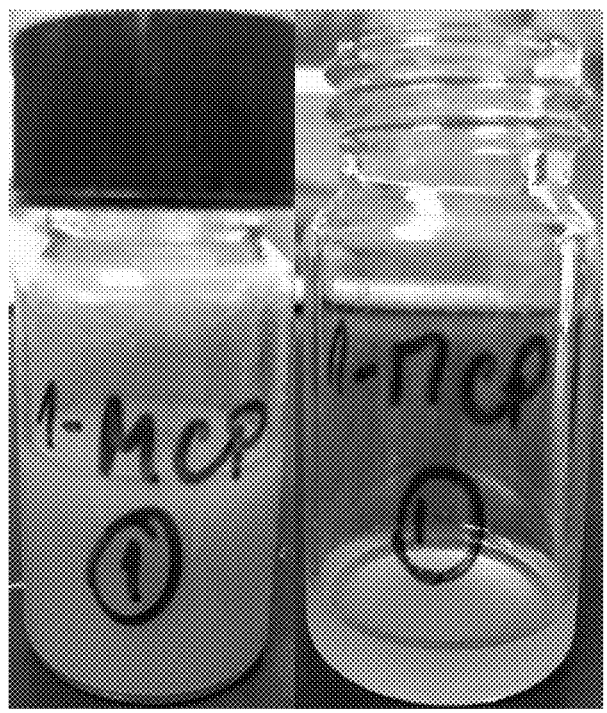
FIG. 3: Synthesis product obtained (1-MCP) by method 1.
Figure 4:
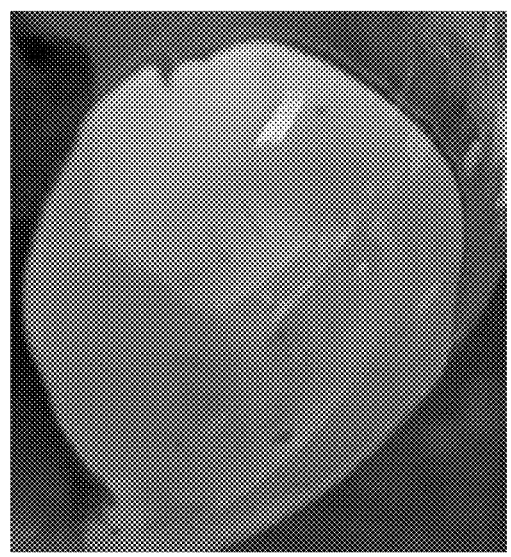
FIG. 4: Synthesis product obtained (1-MCP) by method 2.

Subsequently, the reaction product obtained in both methods was filtered by gravitation and the solid was washed with dry tetrahydrofuran (THF), and then dried and stored in an argon atmosphere (Sample 2) (FIGS. 3 and 4).

Procedure for the Preparation of Modified 1-MCP Nanobubbles
a.—Production of nano-bubbles by 1-MCP gas dispersion in different aqueous solutions.

Once the solid product was obtained, it was neutralized using 1 L of a 0.1 N NaCl solution. The generation of the 1-MCP nanobubbles was carried out by supplying the released 1-MCP as a dispersion in water to achieve a 20% v/v concentration. Then, the different types of sugars (sucrose and starch) and salts were added in concentrations in the range of 0.01 ppm and 3 ppm. The stirring speed was 25,000 rpm at 2 L volumes with 1-7 minute rotational exposures. The optimum range of the peripheral speed fell between 6 and 24 m/s, where the amount of power supplied to the system was 500 W.
b.—Sugar Modified 1-Mcp Nanobubbles Preparation of the sugar modified 1-MCP nanobubbles was carried out by dispersing the 1-MCP gas in different aqueous solutions containing food grade sugars, selected from the group consisting of sucrose esters, maltodextrins, different types of starches, hydroxymethyl cellulose, disaccharides and monosaccharides in general, in a concentration ranging from 0.01-3 ppm. 1-Methylcyclopropene gas, obtained in situ from a Fischer and Douglas synthesis, is used.

All of the stabilized 1-methylcyclopropene nanobubble solutions were stored at 4° C. to study their stability and characteristics using DLS, Nanosight and their application in the field.
Characterization of the of the Modified 1-Methylcyclopropene (1-MCP) Nanobubbles In order to determine the stability of the modified 1-MCP nanobubbles, a dynamic light scattering analysis (DLS) was performed, which is sometimes referred to as quasi-elastic light scattering (QELS), a non-invasive and well established technique for measuring the size and size distribution of the molecules and particles, typically in the sub-micron region. Typical applications of dynamic light scattering are for the characterization of particles that have been dispersed or dissolved in a liquid. The Brownian motion of the suspended particles or molecules causes the laser light to scatter at different intensities. From the analysis of these intensity fluctuations, the speed of Brownian motion and, therefore, the particle size is obtained using the Stokes-Einstein ratio:

$$DAb = [kT/(6\pi r \mu s)]$$

Stokes-Einstein equation deduced from the hydrodynamic theory, applicable to the diffusion of colloidal particles through a solvent that behaves as a continuous medium, $D_{ab}$: Diffusion constant; r: radius of solute; μs: solvent viscosity; kb: Boltzmann's constant; T: temperature; and π: pi, irrational number.

The size (hydrodynamic diameter) and size distribution of the stabilized 1-MCP nanobubbles was determined by dynamic light scattering (DLS) using Nano Zetasizer Malvern, model ZEN 3600 equipment.
Sizing of Modified 1-MCP Nanobubbles by Dynamic Light Scattering Modified 1-MCP nanobubble size analyses were carried out using dynamic light scattering (DLS) in a Nano Zetasizer Malvern, model ZEN 3600 machine, at a wavelength of 532 nm and a fixed scattering angle of 173°. The liquid sample (1 ml) was measured with a 1 cm optical path cuvette. The samples were measured 12 times in triplicate to obtain a mean size distribution and a standard deviation.

The Z potential of the modified 1-MCP nanobubbles was determined in a Nano Zetasizer Malvern, ZEN 3600 model with a cuvette consisting of a U-shaped capillary cell using two flat parallel plate electrodes (disposable capillary cell, Malvern Instrument, UK). This was measured 12 times in triplicate in order to obtain means and standard deviation.

In addition, the modified 1-MCP nanobubbles were characterized with a Nanosight NS300, in which nanoparticle tracking analysis (NTA) uses both light scattering and Brownian motion properties to obtain the particle size distribution in samples in a liquid suspension. A laser beam is passed through the sample chamber, and the suspended particles in the beam path scatter the light in such a way that they can easily be seen through a 20× magnification microscope at a far working distance where a video camera is mounted. The camera captures a video file of the particles in a Brownian motion state. The Nanoparticle Tracking Analysis (NTA) software tracks many particles individually and uses the Stokes-Einstein equation to calculate their hydrodynamic diameters.

Nanosight provides high resolution measurements of particle size, concentration and aggregation, and also provides real-time monitoring of subtle changes in the characteristics of particle populations, with visual validation to confirm the analysis, where the permanence of a nanometric size and a population or concentration of nanobubbles per ml and their permanence over time are analyzed.

To determine the size and concentration of the modified 1-MCP nanobubbles in Nanosight the samples were prepared in MiliQ water, and subsequently a 1 ml aliquot was taken with a disposable syringe and injected into the Nanosight equipment.

Results a.—Production of nano-bubbles by 1-MCP gas dispersion in different aqueous solutions. The 1-methylcyclopropene nanobubbles were characterized using DLS and Nanosight.

The results show that the 1-MCP nanobubbles obtained using Method 1 have an average size distribution of 90 nanometers and a Z potential of −10.6 eV.

The results show that the 1-MCP nanobubbles obtained using Method 2 have an average size distribution of 100 nanometers.

Nanosight

TABLE 2

Summary of size results (149.7 nm) and 1-MCP nanobubbles concentrations (3.95*107) obtained by Synthesis Method 2. Results

| Stats: Merged Data | |
| --- | --- |
| Mean: | 147.7 nm |
| Mode: | 126.0 nm |
| SD: | 39.8 nm |
| D10: | 101.6 nm |
| D50: | 132.6 nm |
| D90: | 199.3 nm |
| Stats: Mean +/− Standard Error | |
| Mean: | 149.7 +/− 8.2 nm |
| Mode: | 150.0 +/− 25.1 nm |
| SD: | 38.5 +/− 3.0 nm |
| D10: | 102.4 +/− 9.8 nm |
| D50: | 141.6 +/− 8.6 nm |
| D90: | 196.4 +/− 9.9 nm |
| Concentration (Upgrade): | 3.95e+007 +/− 4.99e+006 particles/ml |
| | 5.3 +/− 0.5 particles/frame |
| | 5.5 +/− 0.5 centers/frame |

The 1-MCP nanobubbles obtained by Method 1 were characterized using Nanosight equipment. The results indicate that the nanobubbles have an average size of 147 nm, with a nanobubbles concentration per mL of 3.95*106 (Table 2).

TABLE 3

Summary of size results (148 nm) and 1-MCP nanobubbles concentrations (4.11*107) obtained by Synthesis Method 2. Results

| Stats: Merged Data | |
| --- | --- |
| Mean: | 148.8 nm |
| Mode: | 127.4 nm |
| SD: | 59.3 nm |
| D10: | 93.7 nm |
| D50: | 130.1 nm |
| D90: | 191.0 nm |
| Stats: Mean +/− Standard Error | |
| Mean: | 145.5 +/− 11.8 nm |
| Mode: | 126.8 +/− 3.4 nm |
| SD: | 45.5 +/− 17.4 nm |
| D10: | 102.0 +/− 6.5 nm |
| D50: | 138.5 +/− 8.7 nm |
| D90: | 212.5 +/− 39.1 nm |
| Concentration (Upgrade): | 4.11e+007 +/− 6.28e+006 particles/ml |
| | 4.4 +/− 0.9 particles/frame |
| | 6.7 +/− 2.9 centers/frame |

The 1-MCP nanobubbles obtained by Method 2 were characterized using Nanosight equipment. The results indicate that the nanobubbles have an average size of 148 nm, with a nanobubbles concentration per mL of 4.11*107[ ] (Table 3).

Stability Studies of the Modified 1-MCP Nanobubbles

To determine the stability of the modified 1-MCP nanobubbles, a dynamic light scattering DLS and Nanosight analysis was performed which analyzed the permanence of a nanometric size and a population or concentration of the nanobubbles per ml and their permanence over time, to which end the following studies were carried out:

Results a.—Evolution of Modified Nanobubble Diameter vs Time:

This analysis consisted of measuring the size of the 1-MCP nanobubbles at different times in their evolution; 1, 2, 3, 24 and 192 hours (8 days, 1 month, 6 months, 1 year) at 4° C. and 25° C.

The nanobubbles were stored at 4° C. and 25° C., for 6 months, and we observed that the optimal storage temperature is 4° C.

b.—Critical Diameter vs. RPM Speed

This analysis consisted of measuring critical diameters for different RPM speeds in the homogenizing equipment: 10,000, 15,000, 20,000 and 25,000 RPM.

The optimum diameter was achieved using 25,000 RPM, with lower application speeds resulting in micron size diameters.

c.—Diameter vs. Different Types of Sugars after 1 hour of the nanobubbles' evolution time. During synthesis, the 1-MCP molecule was stabilized with the lithium salt and NaCl (0.1N).

d.—Determine 1-MCP concentration using UV-Visible spectroscopy.

This analysis was carried out by means of a UV-visible spectrophotometric scan in a range between 200 and 800 nanometers. The highest absorbance was found at a wavelength of 220-300 nanometers with a maximum absorbance of 3,000 (u.a) corresponding to a 0.6% v/v concentration.

Sugar Modified 1-Mcp Nanobubbles

Size of the Sugar Modified 1-MCP Nanobubbles Determined by Dynamic Light Scattering (DLS)

FIG. 5 shows a summary of the average percentage of sugar modified 1-MCP nanobubbles, by their diameter in nanometers (Size Statistics Report). The NanoZetasizer equipment software provided an average nanobubble size of 322 nanometers.

Observations and/or conclusions from the summary report delivered by the Nano Zetasizer equipment software (FIG. 5): the sugar modified 1-MCP nanobubbles have an average diameter of 322 nm.

Size and concentration of the sugar modified 1-Mcp nanobubbles

Figure 6:
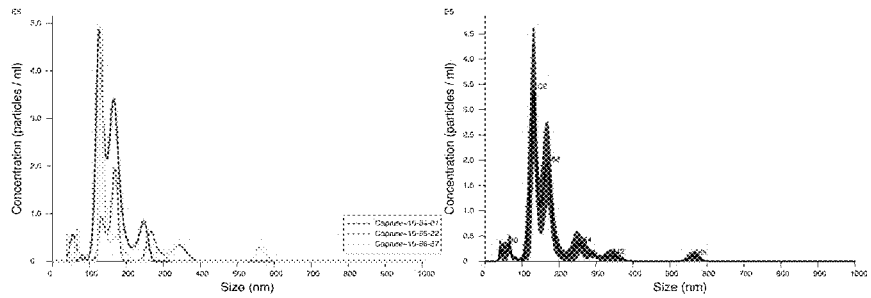
FIG. 6: Concentration of nano-bubbles (particles/nil) v/s diameter in nanometers (Size nm) of sugar modified 1-MCP nanobubbles.
Figure 7:
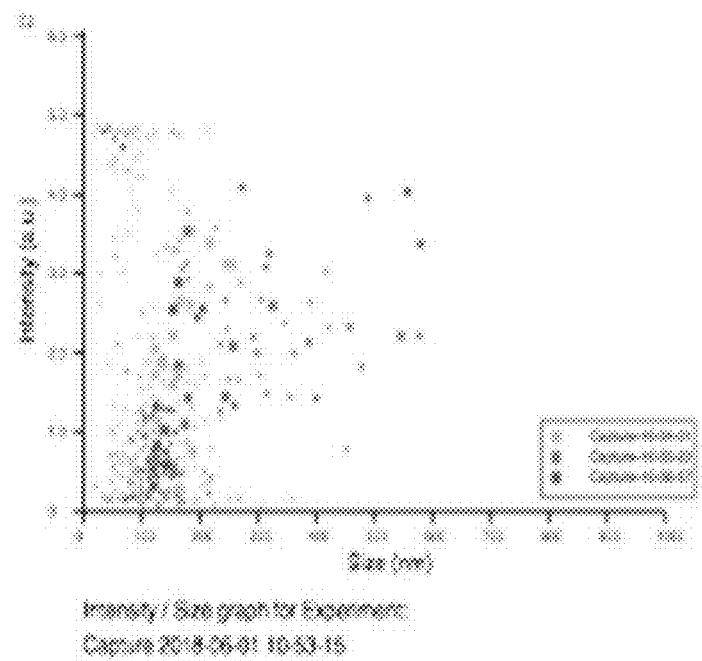
FIG. 7: Size distribution of 1-MCP nanobubbles, with diameter in nanometers (Size nm) of sugar modified 1-MCP nanobubbles.

FIG. 6 shows the concentration of nanobubbles (particles/nil) v/s diameter in nanometers (Size nm) of sugar modified 1-MCP nanobubbles and a summary provided by the Nanosight equipment software of the average nanobubble size in nanometers (nm) with a determined concentration of nanobubbles/ml.

Observations and/or conclusions from the summary report delivered by the Nanosight equipment software: the sugar modified 1-MCP nanobubbles have an average diameter between 171.8 nm+/−15.8 nm and a concentration of $1.67 \times 10^7$ NBs/ml+/−$5.7 \times 10^6$ (FIG. 6).

The results obtained with DLS and Nanosight confirm that the surface of the 1-MCP nanobubbles are modified and/or decorated and stabilized with a sugar.

Determining the Efficacy of the Sugar Modified 1-MCP Nanobubbles—Post Harvest Process in Bananas Experimental Design:

To determine the efficacy of modified 1-MCP nanobubbles in inhibiting the action of ethylene in bananas, for example, the following steps were undertaken.

Three groups of bananas were used with three individual exemplars in each. The bananas were separated into three groups which were respectively sprayed with water, 1-MCP solution in cyclodextrin (SF) and modified 1-MCP nanobubbles (NBS).

Subsequently, the fruit was exposed to 1 ppm of ethylene for 24 hours to accelerate the ripening process and then the different parameters were assessed.

These groups of bananas were placed inside sealed plastic boxes and a treatment of interest was applied to each group (water, 1-MCP solution in cyclodextrin (SF) and modified 1-MCP nanobubbles (NBS)) by spraying. The treatments were designated as: Control (PBS buffer), SF (smartfresh) and NBS (modified 1-MCP nanobubbles).

Following the application of the different treatments, the boxes were sealed and ethylene was applied through a septum located in the lid of each box using a Hamilton syringe, thereby creating a 1 ppm concentration of ethylene inside the box. The boxes remained sealed for 24 hours and were then opened. The color of the fruit was photographed using a colorimeter. Each individual (banana) was independently assessed every 24 hours for approximately one week.

Figure 8:
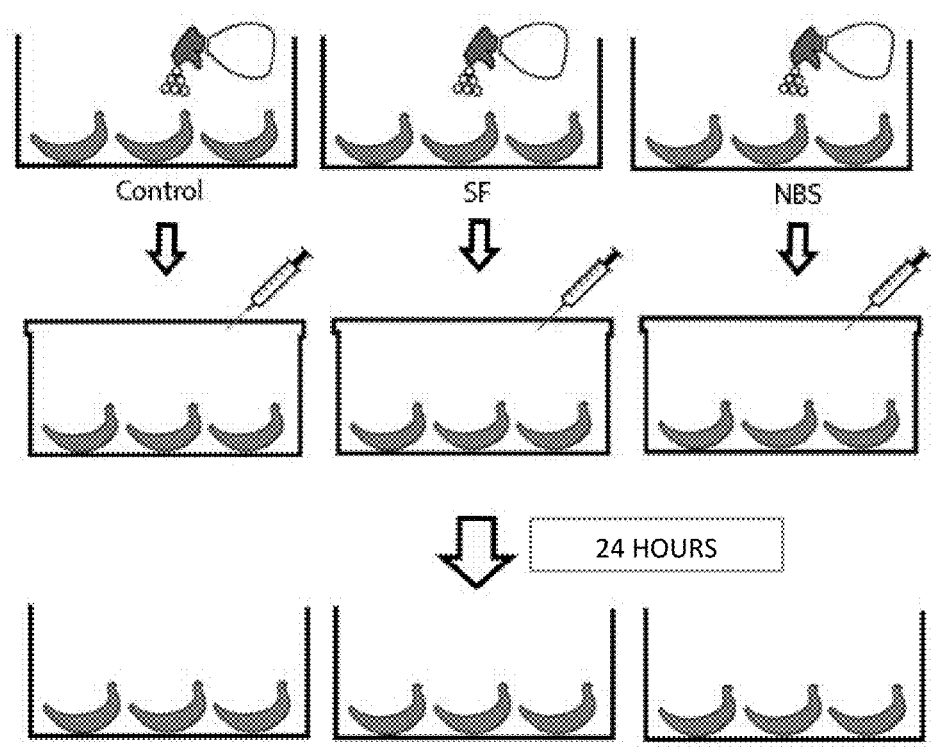
FIG. 8: Experimental design. The figure shows bananas separated into three groups that were respectively sprayed with water, 1-MCP solution in cyclodextrin (SF) and modified 1-MCP nanobubbles (NBS). The fruit was also exposed to 1 ppm of ethylene for 24 hours to accelerate the ripening process, and subsequently different parameters were assessed.

FIG. 8 shows the experimental design where the bananas were separated into three groups which were respectively sprayed with water, 1-MCP solution in cyclodextrin (SF) and modified 1-MCP nanobubbles (NBS). Subsequently, the fruit was exposed to 1 ppm of ethylene for 24 hours to accelerate the ripening process after which the different parameters were assessed.

Results:

Using a colorimeter it was possible to record the change in color of the bananas over time. The L*, a* and b* indices (CIE 1976) were used, which denote the changes in luminosity and color in the red-blue (a*) and blue-yellow (b*) ranges presented in Table 4. It was observed that in the first 72 hours the three treatments produced a very similar color, however, after 96 hours of treatment the Control changed its color from green to yellow, indicating that this group had begun to ripen.

TABLE 4

Color data expressed as L*, a* and b* parameters for each treatment (Control, 1-MCP in cyclodextrins and NBS) at 24, 48, 72, 96, 168 and 192 hours.

| Treatment | Time (h) | L* | a* | b* |
|---|---|---|---|---|
| Control | 0 | 53.07 | −16.74 | 35.39 |
| SF | 0 | 55.65 | −17.26 | 35.48 |
| NBS | 0 | 50.81 | −15.65 | 32.31 |
| Control | 24 | 54.06 | −13.67 | 35.23 |
| SF | 24 | 54.51 | −14.49 | 35.15 |
| NBS | 24 | 52.50 | −15.70 | 34.09 |
| Control | 48 | 52.90 | −14.66 | 35.45 |
| SF | 48 | 52.74 | −14.05 | 34.65 |
| NBS | 48 | 50.94 | −15.46 | 33.01 |
| Control | 72 | 54.21 | −13.97 | 37.82 |
| SF | 72 | 51.19 | −13.65 | 32.39 |
| NBS | 72 | 50.97 | −14.68 | 32.30 |
| Control | 96 | 60.53 | −7.23 | 42.13 |
| SF | 96 | 50.32 | −13.11 | 32.21 |
| NBS | 96 | 51.40 | −15.25 | 32.20 |
| Control | 168 | 64.01 | 2.85 | 49.02 |
| SF | 168 | 49.97 | −12.52 | 31.74 |
| NBS | 168 | 48.73 | −13.13 | 31.34 |
| Control | 192 | 62.94 | 5.12 | 49.31 |
| SF | 192 | 49.5 | −12.2 | 31.69 |
| NBS | 192 | 49.87 | −13.87 | 31.81 |

This change in color was also evident in the photographic record (FIGS. 4A and 4B).

Figure 9A:
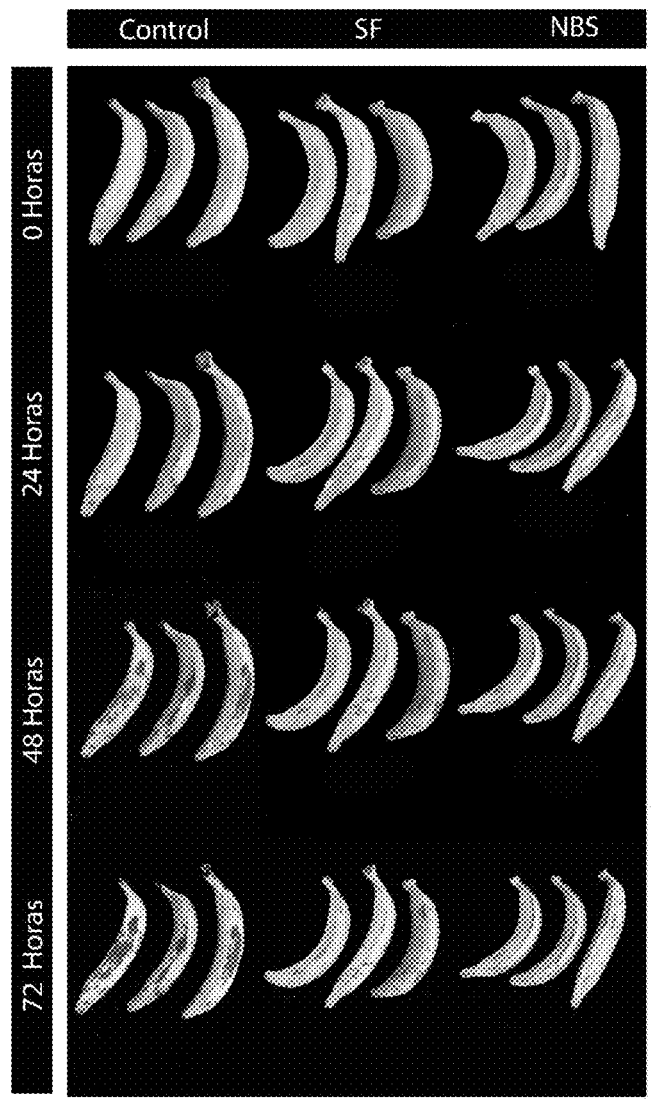
FIG. 9A: Photographic record of the bananas after being exposed to 1 ppm ethylene for 24 h and air stored at 20° C.
Figure 9B:
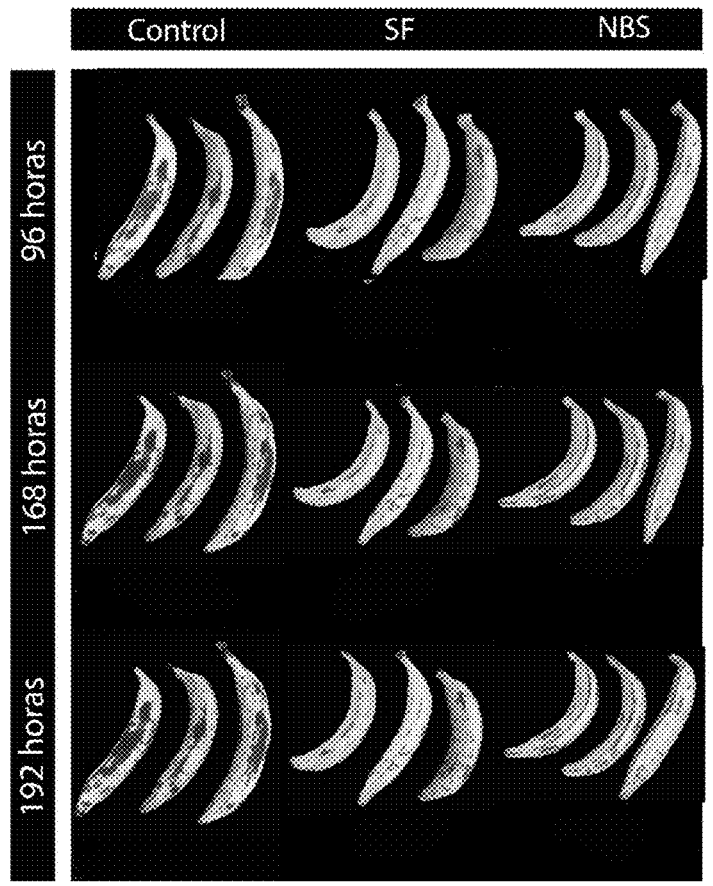
FIG. 9B: Photographic record of the bananas after being exposed to 1 ppm ethylene for 96 h and air stored at 20° C.

FIGS. 9A and 9B show the photographic record of the bananas after having been exposed to 1 ppm of ethylene for 24 hours and 96 hours in a storage in air at 20° C., where it can be observed that the bananas sprinkled nanobubbles modified 1-MCP (NBS) have considerably delayed maturation unlike the control treatment.

Figure 10:
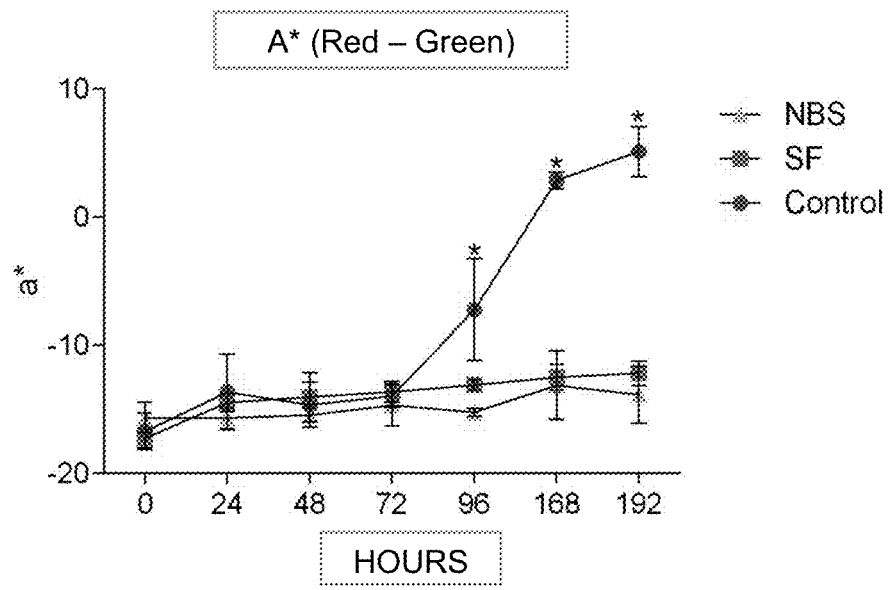
FIG. 10: Evolution of the color parameter a* (CIE 1976, color in the red-blue ranges) of water-treated bananas (control), 1-MCP in cyclodextrin (SF) and modified 1-MCP nanobubbles (NBS) after being exposed to 1 ppm of ethylene for 24 h and air storage at 20° C.

FIG. 10 shows the differences in the a* value (red-green range, CIE 1976) over time (0, 24, 48, 72, 96, 168 and 192 hours) for the Control (Red), SF (blue) and NBS (yellow) treatments. The bars represent the standard deviation, * is the statistical differences using a Tukey test at $p<0.05$. Observation shows that the Control treatment had a skin color evolution which can be seen with a positive a* value which is due to the advanced ripening when compared to the fruits treated with 1-MCP in cyclodextrin and modified 1-MCP nanobubbles.

Figure 11:
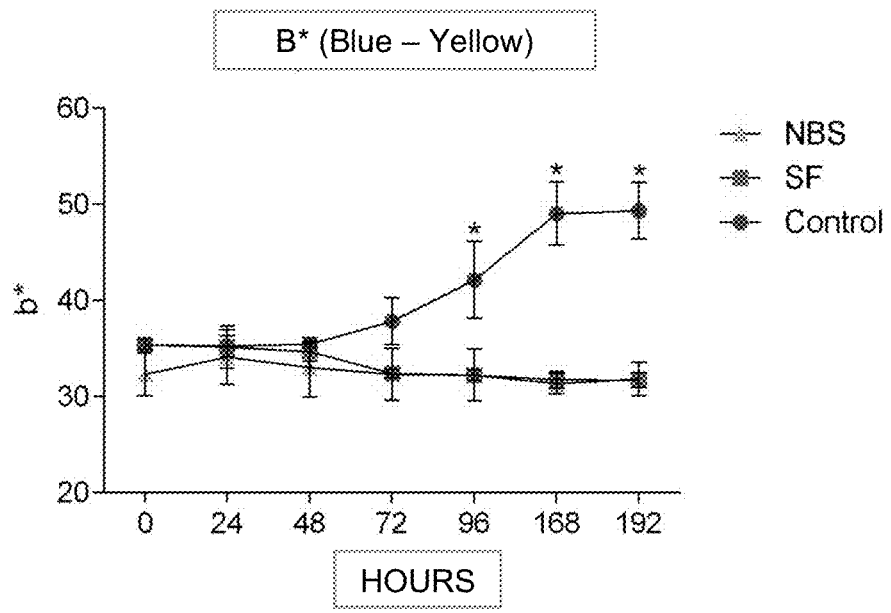
FIG. 11: Evolution of the color parameter b* (CIE 1976, color in the blue-yellow ranges) of water-treated bananas (control), 1-MCP in cyclodextrin (SF) and modified 1-MCP nanobubbles (NBS) after being exposed to 1 ppm of ethylene for 24 h and air storage at 20° C.

FIG. 11 shows the differences in the b* value (yellow-blue range) CIE 1976) over time (0, 24, 48, 72, 96, 168 and 192 hours) for the Control (Red), SF (blue) and NBS (yellow) treatments. The bars represent the standard deviation, * represents the statistical differences using a Tukey test at $p<0.05$. After 192 h, the Control showed a noticeable yellow color (49.31) due to advanced ripening compared to the fruit treated with 1-MCP in cyclodextrin and modified 1-MCP nanobubbles.

Figure 12:
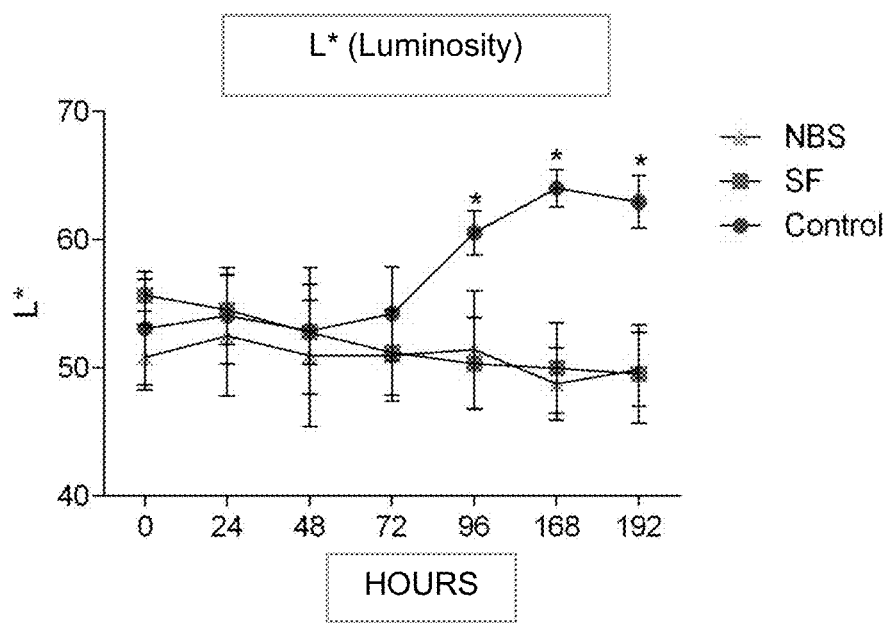
FIG. 12: Evolution of the luminosity color parameter L* (CIE 1976) (CIE 1976) of water-treated bananas (control), 1-MCP in cyclodextrin (SF) and modified 1-MCP nanobubbles (NBS) after being exposed to 1 ppm of ethylene for 24 h and air storage at 20° C.

FIG. 12 shows the differences in the L* value (luminosity, CIE 1976) over time (0, 24, 48, 72, 96, 168 and 192 hours) for the Control (Red), SF (blue) and NBS (yellow) treatments. The bars represent the standard deviation. Asterisks indicate statistical differences using Tukey test at $p<0.05$. These results indicate a greater ripening in the Control treatment and loss of green color, therefore, the bananas' skins had a higher luminosity in comparison with the fruits treated with 1-MCP in cyclodextrin and modified 1-MCP nanobubbles.

The results show that, after 96 hours of monitoring, the parameters L*, a* and b* show a significant increase in the Control treatment compared to SF and NBS. These differences carry through to the end of the tests (192 hours). With respect to the SF and NBS treatments, no significant differences were observed from these treatments throughout the experiment in any of the parameters assessed, which indicates an effective ripening control in spite of the 1 ppm ethylene challenge.

The value of a* (red-green range, CIE 1976) indicates that the more negative this value is, the closer to the green hues the sample is. Similarly, the b* value moves between the blue and yellow colors. The more positive this value is, the more yellow the sample. With this perspective in mind, it can be concluded that after 96 hours the control bananas suffered a loss of green color and a gain of yellow color. In contrast, the SF and NBS treatments did not change significantly over the course of the trials conducted.

The color change from green to yellow is part of a banana's normal ripening, and the results indicate that the fruit with the SF and NBS treatments underwent a delay in ripening unlike the fruit in the Control treatment.

Determination of Soluble Solids

To carry out this test, pulp was extracted from each individual (banana), homogenized using a ceramic mortar, and then placed in a tube and centrifuged at 20,000×g for 5 minutes. Next, a drop of the supernatant was used and the soluble solids content was measured using a digital refractometer. Table 5 shows the soluble solids contents (Brix degrees).

TABLE 5

Soluble Solids Content (Brix Degrees)

| Control | 1-MCPcyclodextrin | NBS modified 1-MCP |
|---|---|---|
| 33.1 | 8.6 | 6.3 |
| 33.4 | 7.5 | 6.3 |
| 36.6 | 6.6 | 7.8 |
| 34.4 | 7.6 | 6.8 |

In the industry, the soluble solids content is used as an indicator of ripeness. The tests carried out show that the Control had 34.4 Brix degrees compared to the 1-MCP cyclodextrin and NBS treatments, which respectively had 7.6 and 6.8 Brix degrees. This indicates that the Control treatment was fully ripe at the end of the experiment, unlike the 1-MCP cyclodextrin and NBS treatments. These sugars, preferably sucrose, come from the gradual degradation of the starch during the ripening process.

Experimental Design for the Application of Sugar Modified 1-MCP Nanobubbles on Cherries; Field Application The aim of this study was to determine whether spraying modified 1-MCP nanobubbles on cherries prior to cherry harvesting has an effect on the preservation of the cherry's stem green color.

Figure 13:
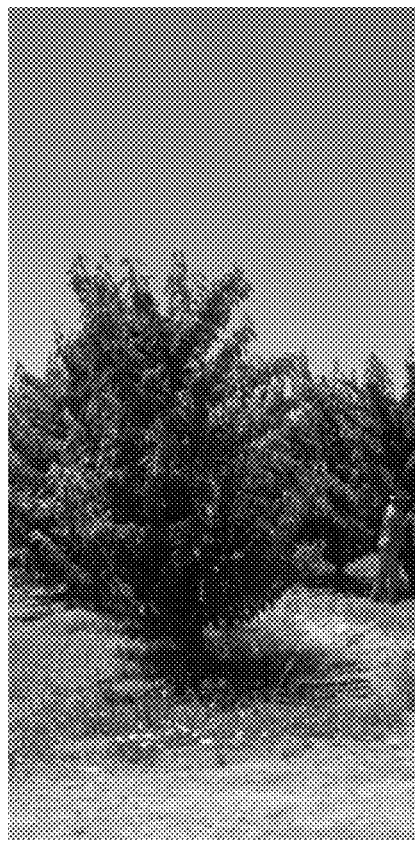
FIG. 13: Cherry tree.

The field studies regarding spraying modified 1-MCP nanobubbles were conducted on cherry trees (*Prunus cerazus*). A site located in Chile's Seventh Region was chosen, where three approximately three meter tall cherry trees were selected and marked with red ribbons. There was a separation of at least 5 meters between the cherry trees chosen (FIG. 13).

Figure 14:
FIG. 14: Cherry after applying modified 1-MCP nanobubbles.

Subsequently, 500 mL of the modified 1-MCP nanobubble sample was sprayed onto the selected cherries (FIG. 14).

The cherries were harvested 24 hours after the application of modified 1-MCP nanobubbles.

Experimental Design for Assessing the Effectiveness of Modified 1-MCP Nanobubbles To determine the efficacy of the modified 1-MCP nanobubbles in inhibiting ethylene's post-harvest effect on the cherry stems, the following tests were performed, using three groups of cherries with three individuals in each group.

These groups of cherries were stored inside sealed plastic boxes and each group was labeled. Group 1: untreated cherries without any application of modified 1-MCP nanobubbles. Group 2: treated cherries, where modified 1-MCP nanobubbles were applied to the cherries 24 hours before harvest. Refrigeration was technique employed to preserve the cherries. Both the cherries that were treated with modified 1-MCP nanobubbles (Treated Cherries) and the untreated cherries (Untreated Cherries) were stored for 30 days at a temperature of 0±0.5° C. and 95% relative humidity.

The boxes remained sealed for 30 days and were then opened. The color of the cherry's stems was tracked. Each individual (cherry) was independently evaluated.

Experimental Design of 1-MCP Application on Blueberries in the Field.

The aim of this study was to determine whether the application of modified 1-MCP nanobubbles to pre-harvest blueberries (*Vaccinium myrtillos*) has an effect on the preservation of blueberries stored for 30 days post-harvest.

Figure 15:
FIG. 15: Site selected for testing the application of modified 1-MCP nanobubbles on blueberries.

The field application studies of modified 1-MCP nanobubbles were performed on blueberries at a site located in Chile's Seventh Region. Three approximately 1.5 meters tall blueberry bushes were selected (FIG. 15).

Figure 16:
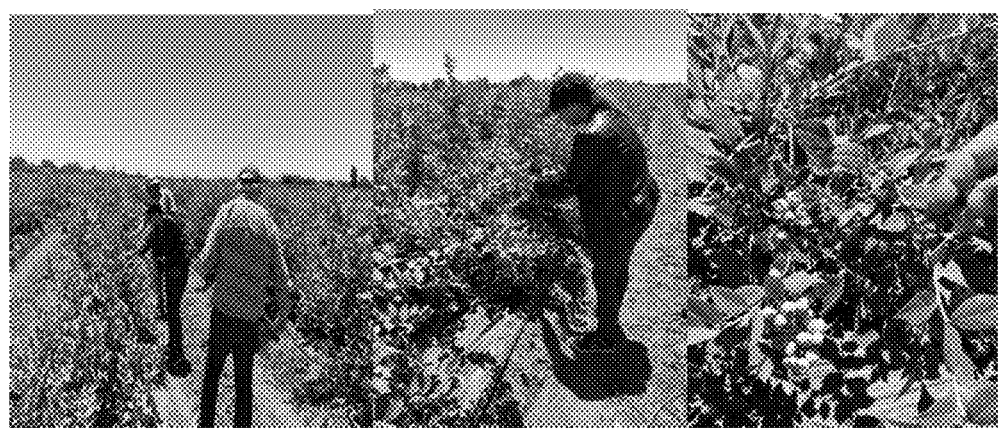
FIG. 16: Selection of blueberry bushes marked with orange ribbons.

The selected bushes were marked with orange ribbons and there was a separation of at least 3 rows between them (FIG. 16).

Figure 17:
FIG. 17: Blueberry harvest with treatment.

Once the bushes were selected and marked, the sample of modified 1-MCP nanobubbles was applied (Treated Blueberries). After waiting for approximately one hour following the application of the treatment Group 1, Untreated Blueberries, and Group 2, Treated Blueberries, were harvested (FIG. 17).

The blueberries were stored and preserved in refrigeration at 0+/−0.5° C. for 30 days at 95% relative humidity.

To determine the efficacy of the modified 1-MCP nanobubbles in inhibiting ethylene's post harvest effect on blueberries, the following tests were performed using three groups of blueberries (1 blank untreated group, two treated groups).

These groups of blueberries were stored in plastic boxes and each group was labeled. Group 1(a): Untreated Blueberries; Group 2 (b and c): Treated Blueberries.

The boxes remained closed for 30 days and were then opened, and the color of the blueberries was checked.

Results

Figure 18:
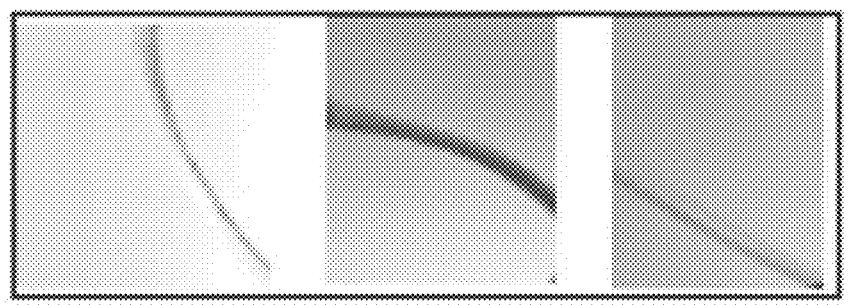
FIG. 18: Treated cherry stems stored for 30 days at 0° C.
Figure 19:
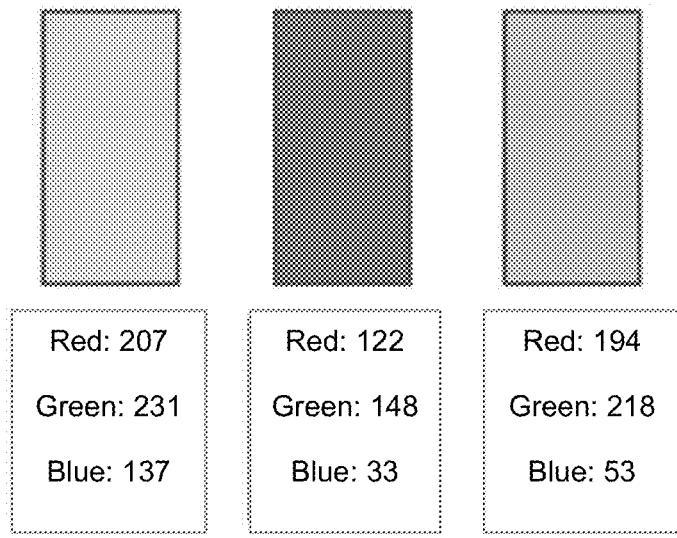
FIG. 19: Coloring of the cherry stems treated with modified 1-MCP nanobubbles, stored for 30 days at 0° C.
Figure 20:
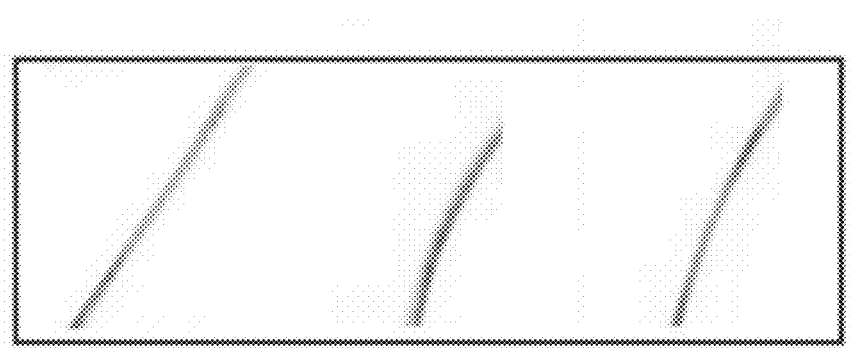
FIG. 20: Untreated cherry stems stored for 30 days at 0° C.

Experimental Design for the Application of Modified 1-MCP Nanobubbles on Cherry Trees; Field Application Following storage of the treated and untreated cherries under refrigeration at 0+/−0.5° C. for 30 days, it was observed that the treated cherries (FIG. 18) maintained the green coloring of their stems (FIG. 19), unlike the untreated control cherries (FIG. 20) whose stems turned a dark brown color (FIG. 21).

Experimental Design of 1-MCP Application on Blueberries in the Field.

Figures 23A, 23B, 23C:
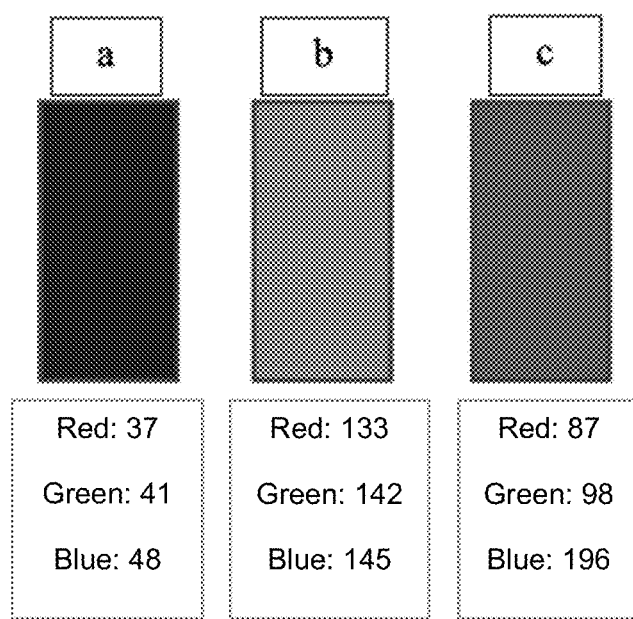
FIGS. 23A-23C: Coloring of post-harvest blueberries without treatment (FIG. 23A) and blueberries treated with 1-MCP nanobubbles (FIGS. 23B and 23C).

Following storage of the treated and untreated blueberries (FIG. 22) under refrigeration at 0+/−0.5° C. for 30 days, it was observed that the treated blueberries (FIGS. 23a and 23 c) maintained their coloring unlike the untreated blueberries which had darkened over time (FIG. 23 a).

FIGS. 21A-21C show that all the cherry samples stored for 30 days at 0° C. change their initial green coloration to brown, as expected for cherry storage during a 30-day period.

FIGS. 22A-22C show that it is possible to maintain the post-harvest coloration of blueberries when they are treated with 1-MCP nanobubbles and subsequently stored under refrigeration at 0+/−0.5° C. for 30 days (FIGS. 22B and 22C). However, this effect was not observed in untreated blueberries, which turned dark over time (FIG. 22A).

FIGS. 23A-23C show the variation of coloration in the post-harvest blueberries without treatment, red, green and blue colors changed to values less than 50 u.a. (u. a.=arbitrary unit) (FIG. 23A). In contrast, post-harvest blueberries that were treated with 1-MCP nanobubbles show that colors red, green, and blue remained between values of 87-196 u.a. (FIGS. 23B and 23C). These values confirm that the post-harvest coloration of blueberries treated with 1-MCP nanobubbles and subsequently stored under refrigeration at 0+/−0.5° C. is maintained for 30 days (FIGS. 22B and 22C), an effect that it was not observed in blueberries without treatment, which turned dark over time (FIG. 22A).

The invention claimed is:

1. Stable nanobubbles in an aqueous medium, comprising methylcyclopropene (1-MCP) as an ethylene inhibitor and at least one food grade sugar that exerts a polarizing effect on the nanobubbles as a stabilizing medium selected from the group consisting of sucrose esters, maltodextrins, various starches, hydroxymethyl cellulose, disaccharides and monosaccharides, wherein the concentration range of the food-grade sugar in the aqueous medium varies between 0.01 ppm and 3 ppm and the nanobubbles are able to remain in the aqueous medium for a period of time up to 12 months.

* * * * *